United States Patent [19]

Schulz

[11] 4,450,043

[45] May 22, 1984

[54] METHOD FOR RECOVERING PULP FROM PRESSURE-SENSITIVE CARBONLESS COPYING PAPER WASTE

[75] Inventor: William J. Schulz, Cloquet, Minn.

[73] Assignee: Appleton Papers Inc., Appleton, Wis.

[21] Appl. No.: 357,400

[22] Filed: Mar. 12, 1982

[51] Int. Cl.³ ............................................. D21C 5/02
[52] U.S. Cl. ...................................... 162/5; 435/278
[58] Field of Search ................... 162/5; 435/264, 277, 435/278, 275

[56] References Cited

U.S. PATENT DOCUMENTS 3,652,383  3/1972  deVos ...................................... 162/5
4,356,058  10/1982  Fischer et al. ........................... 162/5

FOREIGN PATENT DOCUMENTS 2836156  3/1980  Fed. Rep. of Germany ...... 435/264
50-29042  9/1975  Japan ...................................... 162/5

*Primary Examiner*—William F. Smith
*Attorney, Agent, or Firm*—E. Frank McKinney; Paul S. Phillips, Jr.

[57] ABSTRACT

A process for recovering pulp from pressure-sensitive carbonless copying paper waste is disclosed. This process includes defibrating the waste without substantial rupture of the microcapsules, treating the defibrated waste with an enzyme for starch saccharification and separating the fibers from the released microcapsules by means of a sidehill screen equipped with a washing shower.

7 Claims, No Drawings

METHOD FOR RECOVERING PULP FROM PRESSURE-SENSITIVE CARBONLESS COPYING PAPER WASTE

This invention relates to a method of recovering fibers from waste pressure-sensitive carbonless copying paper. The method is especially useful for recovering fiber from waste pressure-sensitive carbonless copying paper wherein the walls of the microcapsules employed in the paper were produced by polymerization methods utilizing monomers or initial condensates of synthetic resins.

This invention comprises the steps of defibrating the waste without substantial rupture of the microcapsules, treating the defibrated waste with an enzyme for starch saccharification to break the adhesive bonds between the microcapsules and the fibers and separating the fibers from the released microcapsules by means of a sidehill screen equipped with a washing shower.

Well known in the art are pressure-sensitive mark-forming units and systems comprising color former components, generally present as a solute in a liquid solvent which is the core or nucleus material in pressure-rupturable microcapsules coated on a supporting sheet material and color developer components distributed in particulate form on a supporting sheet material, both components being arranged in proximate relation to each other, so that, upon the application of marking pressure to the microcapsules, the microcapsules rupture and release the solution of color former, with the consequent contact of the color developer components producing a mark or color in those regions where pressure is applied. Such pressure-sensitive copying papers are described in, for example, U.S. Pat. Nos. 2,712,507; 2,730,456; 2,730,457; 3,455,721; 3,672,935; 4,001,140; 4,087,376; 4,089,802 and 4,100,103.

Conventional waste paper can be defibrated comparatively easily with various defibrating machines and optionally further threated to yield a regenerated pulp which can be utilized alone or in admixture with other furnishes to produce comparatively high quality paper.

When waste paper comprising pressure-sensitive carbonless copying paper is defibrated, microcapsules can be ruptured during the defibration because of the grinding action exerted on them. The color former released by such rupture reacts with the color developer to produce color. The color, so-produced, results in stained pulp which cannot be subsequently used as a raw material for high quality paper. Because of this disadvantage, edge trimmings and damaged paper resulting from the production of pressure-sensitive carbonless copying paper, together referred to in the industry as broke or waste, have met with a limited acceptance and consequent low price in the recycled paper market.

Various techniques have been employed to attempt to overcome these disadvantages resulting from carbonless copying paper waste. U.S. Pat. No. 3,933,578 discloses a method of recovering fibers from pressure-sensitive copying paper waste which comprises, in the defibration process, using an alkaline solution containing a surface active agent. This process results in rupture of the microcapsules, but color formation between the released color formers and the color developer is inhibited by the surface active agent employed. This process finds particular utility for pressure-sensitive copying paper waste wherein the walls of the microcapsules employed in the paper were produced by a coacervation process, such as, for example, a process using gelatin with gum arabic or carboxymethyl cellulose, or other materials. Such coacervation processes are described in U.S. Pat. Nos. 2,800,457; 3,041,289 and 3,533,958.

Japanese Patent Disclosure No. 51-23302 describes a method for recovering pulp from waste paper comprising pressure-sensitive carbonless copying paper wherein the waste paper is defibrated in the presence of a base and the resulting pulp is separated, washed at least once and flotation treated to remove the colored and non-colored undesirable components.

German Patent Disclosure No. 2,642,319 discloses a process for the regeneration of waste paper comprising microencapsulated components through the use of a bleaching agent, followed by foam flotation.

U.S. Pat. No. 4,264,412 describes a process for recovering fibers from pressure-sensitive carbonless copying paper waste wherein the waste is defibrated in aqueous media, the wastage is treated with acid to destroy the microcapsules and the resulting mixture is treated with a bleaching agent.

U.S. Pat. No. 3,910,813 discloses a process for reclaiming both the color former solution and the paper fibers of pressure-sensitive carbonless copying paper waste. In this process, the waste paper is shredded, extracted with a solvent capable of penetrating the microcapsule walls forming a color-forming-solution/-solvent solution, the solution is separated from the fibers and the solvent is separated from the color former solution by distillation.

The above-disclosed processes for regeneration of fibers from waste pressure-sensitive carbonless copying paper result in rupture of the microcapsules contained therein. The resulting color, formed by contact of the released color former and the color developer, is either inhibited through the use of surface active agents or removed by flotation, or the action of a bleaching agent.

When these prior art pulp recovery processes are applied to pressure-sensitive carbonless copying paper wherein the walls of the microcapsules employed in the paper were produced by polymerization methods utilizing monomers or initial condensates of synthetic resins, such as those disclosed in U.S. Pat. Nos. 4,001,140; 4,087,376; 4,089,802 and 4,100,103, a large number of the microcapsules go through these processes intact. The pulp reclaimed from such processes continues to have unruptured microcapsules adhered thereto. Paper produced subsequently from such regenerated pulp suffers from the disadvantage of being pressure-sensitive due to the presence of the intact microcapsules adhered to the reclaimed fibers comprising the paper furnish. Normal writing or other pressures rupture these residual microcapsules, releasing the color former solution contained therein which can react with components of the paper furnish to produce undesirable color. Thus, even though these prior art processes can be utilized to regenerate carbonless copy paper waste which can, in turn, be used to produce a fine paper which appears to be satisfactory, subsequent application of pressure to such paper, and subsequent undesirable production of color, reveals the unsatisfactory nature of such prior art reclaiming processes.

It is an object of the present invention to provide a fiber recovery process for pressure-sensitive carbonless copying paper waste which relies upon removal of unruptured microcapsules from the defibrated waste.

It is a further object of the present invention to provide a process for recovery of fibers which, when reused in the manufacture of paper, are not subject to accidental coloration.

It is yet another object of the present invention to provide a fiber recovery process which has particular utility with pressure-sensitive carbonless copying paper waste wherein the walls of the microcapsules employed in the paper were produced by polymerization methods utilizing monomers or initial condensates of synthetic resins.

The present invention provides a process for the recovery of fibers from waste pressure-sensitive carbonless copying paper, which comprises defibrating the waste in aqueous media, adjusting the pH of the mixture to near neutral, e.g. 6.0–7.5, adding a saccharifying enzyme and washing the defibrated waste in a sidehill screen equipped with a washing shower to separate the fibers from the other components of the waste.

The defibration is preferably carried out at temperatures higher than room temperature, e.g. up to about 150° F., and under pH conditions which optimize the degradation of the wet strength resins, if any, existing in the base stock of the copying paper waste. Some of these resins are degraded only under acidic conditions and others are degraded only under basic conditions. In order to best accomodate the possibility that both types of wet strength resins are present, it is best to defibrate for a period of time under one set of conditions, such as, for example, acidic conditions in the presence of an acid pulping aid followed by adjusting the defibrating medium to basic conditions and continuing to defibrate for a period of time.

If the waste paper being processed is a colored grade, bleach should be added after the defibration process in order to obtain white recycled fibers for unrestricted subsequent use.

Following defibration and bleaching, if any, the next step is the adjustment of the pH to near neutral, e.g. 6.0–7.5, and the addition of an amylolytic enzyme for saccharification of the starches present. While the exact mechanism of this step is not known, it is believed that the enzyme effectively breaks the starch bond adhering the microcapsules to the fibers. This step, surprisingly, was found to be required in order to release sufficient microcapsules from the fibers during the process. Without this step sufficient microcapsules remain associated with the recovered fibers to render paper, produced subsequently from such regenerated pulp, of limited value for reasons previously cited.

Following the addition of the saccharifying enzyme, the fibers are separated from the microcapsules and other non-fibrous constituents in a sidehill screen equipped with a washing shower in a multistage arrangement such as, for example, those disclosed in U.S. Pat. Nos. 3,451,555 and 3,452,876. The product of this separation step is the regenerated fiber which is suitable for use in papermaking processes.

The following Examples are given merely as illustrative of the present invention and are not to be considered as limiting. Unless otherwise noted, the percentages therein and throughout the application are by weight.

EXAMPLES OF THE INVENTION

The general procedure followed for the recovery process is as follows. Pressure-sensitive carbonless copying paper waste is defibrated in water to which has been added an acid repulping aid in a low shear pulper at a consistency of five to nine percent. Sulfuric acid is added to further lower the pH to 3.5–4.5 if necessary. A wetting agent is optionally employed in the aqueous media. Steam is added to the mixture until the temperature reaches 145°–150° F. After about one hour of agitation, the pH of the stock is raised to 8–9 with an aqueous sodium hydroxide solution and the agitation is continued until defibration is complete. Bleach is added to decolor the basestock dyes, if any, the stock is diluted, the pH of the stock is adjusted to 6.0–7.5 with sulfuric acid and the enzyme for starch saccharification is added. The stock is then fed to a sidehill screen equipped with a washing shower to separate the fibers from the undesirable non-fibrous constitutents.

Using substantially the procedure described above, several experiments were performed in which fibers were recovered from pressure-sensitive carbonless copying paper waste. The measure of success of the recovery process was the determination of the percent removal of the microcapsules from the waste. These examples are listed in Table 1.

TABLE 1

| | | Example 1 | Example 2 | Example 3 | Example 4 |
|---|---|---|---|---|---|
| Pulping Aid | Type | Pulp Aid 101 | Pulp Aid 101 | Pulp Aid 101 | Pulp Aid 101 |
| | Amount | 1% | 1% | 1% | 1% |
| pH during acid defibration | | 4.5 | 4.5 | 4.2 | 4.0 |
| Temperature | | 150° F. | 150° F. | 150° F. | 150° F. |
| pH during basic defibration | | 8.5 | 8.5 | 8.5 | 8.0 |
| Bleach | Type | — | Solvox KS | Solvox KS | Solvox KS |
| | Amount | — | 1% | 1% | 1% |
| pH after defibration | | 7.0 | 7.5 | 7.0 | 7.0 |
| Enzyme | Type | Vanzyme FE | Vanzyme FE | Vanzyme FE | Vanzyme FE |
| | Amount | 50 gm/ton | 50 gm/ton | 50 gm/ton | 50 gm/ton |
| Type of Capsule (Pat. Ref.) | | 3,041,289 | 3,041,289 | 4,001,140 | 4,001,140 |
| % Capsule Removal | | 90% | 90% | 94% | 89% |

Pulp Aid 101 is an acidic water soluble ester material supplied by Laurel Products Corp., 2600 East Tioga St., Philadelphia, PA.

Solvox KS is calcium hypochlorite supplied by Solvox Mfg. Co., 11725 W. Fairview Avenue, Milwaukee, Wis.

Vanzyme FE is an enzyme for starch saccharification supplied by R. T. Vanderbilt Co., Inc., New York, N.Y.

EXAMPLE 5

This example of a fiber recovery process, performed on pressure-sensitive carbonless copying paper waste comprising capsules made according to U.S. Pat. No. 3,041,289, was performed in the same equipment as examples 1–4 except that no chemicals were added except Vanzyme FE at the rate of 50 gm per ton. The percent capsule removal in this case was 83%.

Examples 1–5 show a degree of removal of microcapsules which enables the subsequent manufacture of a completely satisfactory paper furnish from the recovered fibers.

The invention being thus described, it will be obvious that the same may be varied in many ways. Such variations are not to be regarded as a departure from the spirit and scope of the invention and all such modifications are intended to be included within the scope of the following claims.

What is claimed is:

1. A process for the recovery of fibers from pressure-sensitive carbonless copying paper waste having color former containing microcapsules, comprising the steps of:
   (a) defibrating the waste in aqueous media in two steps without substantial rupture of the microcapsules wherein one defibrating step is performed under acidic conditions and the other step is performed under basic conditions;
   (b) treating the defibrated waste with an enzyme for starch saccharification; and,
   (c) separating the fibers from the non-fibrous components in a sidehill screen equipped with a washing shower.

2. A process according to claim 1, which further comprises a step in which bleach is applied.

3. A process according to claim 2, wherein the bleaching step is performed after the defibration step.

4. A process according to claim 1, wherein the media is adjusted to a pH of 6.0–7.5 prior to the addition of the enzyme.

5. A process according to claim 1, wherein the microcapsules are produced by polymerization methods utilizing monomers or initial condensates of synthetic resins.

6. A process according to claim 5, wherein the microcapsules are produced by a polymerization reaction between urea and formaldehyde.

7. A process according to claim 1, wherein one defibrating step is performed at a pH less than about 5 and the other step is performed at a pH of about 8 or greater.

* * * * *